(12) United States Patent
Perrier et al.

(10) Patent No.: US 9,945,410 B2
(45) Date of Patent: Apr. 17, 2018

(54) CHEMICAL WALL PLUG

(71) Applicant: ILLINOIS TOOL WORKS INC., Glenview, IL (US)

(72) Inventors: Matthieu Perrier, Valence (FR); Jerome Couvreur, Genissieux (FR); Jean-Paul Marasco, Soyons (FR)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 15/120,959

(22) PCT Filed: Jan. 5, 2015

(86) PCT No.: PCT/US2015/010097
§ 371 (c)(1),
(2) Date: Aug. 23, 2016

(87) PCT Pub. No.: WO2015/126532
PCT Pub. Date: Aug. 27, 2015

(65) Prior Publication Data
US 2016/0363151 A1 Dec. 15, 2016

(30) Foreign Application Priority Data
Feb. 24, 2014 (FR) ...................... 14 51453

(51) Int. Cl.
*F16B 13/04* (2006.01)
*F16B 13/14* (2006.01)
*F16B 13/06* (2006.01)

(52) U.S. Cl.
CPC ............ *F16B 13/144* (2013.01); *F16B 13/04* (2013.01); *F16B 13/061* (2013.01)

(58) Field of Classification Search
CPC ...... F16B 13/04; F16B 13/061; F16B 13/124; F16B 13/14; F16B 13/141; F16B 13/142;
(Continued)

(56) References Cited

U.S. PATENT DOCUMENTS 2,269,646 A * 1/1942 Burke .................... E02D 5/806
114/295
5,725,341 A * 3/1998 Hofmeister .......... F16B 13/143
411/258

(Continued)

FOREIGN PATENT DOCUMENTS

DE 3218036 A1 11/1983
DE 19634931 A1 3/1998
(Continued)

OTHER PUBLICATIONS

ISR and WO for PCT/US2015/010097 dated Mar. 18, 2015.

*Primary Examiner* — Roberta S Delisle
(74) *Attorney, Agent, or Firm* — Hauptman Ham, LLP

(57) ABSTRACT

Wall plug, in particular chemical, comprising (i) a holed tubular jacket, this jacket defining an internal housing which emerges at each of the longitudinal ends of the jacket, and (ii) an outer sock which surrounds the jacket and covers the holes of the jacket, characterized in that said sock covers a first longitudinal end of the jacket so as to close said internal housing on the side of this first end.

13 Claims, 2 Drawing Sheets

(58) Field of Classification Search
CPC .... F16B 13/143; F16B 13/144; F16B 13/145;
F16B 13/146; F16B 37/067
USPC .................................. 411/38, 80.5, 82.3, 28
See application file for complete search history.

(56) References Cited

U.S. PATENT DOCUMENTS

| | | | |
|---|---|---|---|
| 7,708,500 B2* | 5/2010 | Buquet | ................ F16B 13/061 |
| | | | 405/259.5 |
| 8,186,918 B2* | 5/2012 | Bucquet | ................ F16B 13/061 |
| | | | 411/38 |
| 2008/0304920 A1 | 12/2008 | Buquet et al. | |
| 2009/0311067 A1 | 12/2009 | Bucquet et al. | |
| 2011/0135419 A1* | 6/2011 | Carbonelli | ............ F16B 13/144 |
| | | | 411/23 |

FOREIGN PATENT DOCUMENTS

| | | | |
|---|---|---|---|
| EP | 0635646 A2 | 1/1995 | |
| EP | 0833065 A1 | 4/1998 | |
| FR | 2434295 A1 | 3/1980 | |
| FR | 2896283 A1 | 7/2007 | |
| FR | 2903742 A1 | 1/2008 | |

\* cited by examiner

CHEMICAL WALL PLUG

RELATED APPLICATIONS

The present application is a National Phase of International Application Number PCT/US2015/010097, filed Jan. 5, 2015, and claims priority to French Application Number 1451453, filed Feb. 24, 2014.

TECHNICAL FIELD

The invention concerns a wall plug, in particular chemical, notably for fixing a part to a support material, as well as a fixing kit including a screw and such a wall plug.

PRIOR ART

A chemical wall plug is a wall plug that is fixed to a support material with the aid of a thermosetting resin and a hardener or activator to polymerize the resin.

Chemical wall plugs exist for solid materials and for hollow materials.

In a solid material, a hole may be drilled therein, a capsule of resin slid into it in which is housed a capillary tube filled with hardener, before breaking up the combination and mixing the two components. It is also possible to drill a hole and to inject into it resin and a hardener or polymerization activator that mix in it. A stud or a screw may then serve as a fixing element.

In a hollow material, after drilling a hole in the wall of the material, there may be introduced into it a tubular mesh into which resin and a hardener are then injected, the resin expelled from the screen, once polymerized, fixing the mesh to the rear of the wall. Studs and screws may also be used as fixing elements.

All the wall plugs referred to above may be used either in a solid material or in a hollow material.

For a hollow material, there is also known an element including a bearing flange to which is fastened a split skirt, the skirt being adapted i) to be pulled against the rear face of the wall by the action of the tie connecting it to the flange bearing against the front face of the wall and ii) to receive by injection a mixture of resin and hardener for fixing the element to the rear of the wall.

All the wall plugs referred to above, known for a long time, employ purely chemical fixing. A disadvantage of these chemical fixings is that it is necessary to wait for the mixture of components to polymerize and harden before being able to apply any load to the stud or screw.

With many chemical wall plugs it is necessary to inject resin and the applicant has attempted to dispense with this relatively fastidious injection process. Moreover, the applicant has attempted to propose a chemical wall plug that not only can be equally suitable for a hollow material and a solid material but also the fixing of which is no longer purely chemical but also mechanical. It would therefore be feasible to apply a load to the screw before polymerization of the components is finished.

The applicant has therefore proposed, in their previous applications FR-A-2 896 283 and FR-A1-2 903 742, a chemical wall plug including a holed tubular jacket adapted to be compressed by a screw forming a traction element, and including, inside the jacket, a resin component and a hardener component intended to be mixed by virtue of the compression of the jacket and to polymerize to fix the wall plug.

The jacket of the wall plug defines an internal housing in which the polymerization components are situated. This housing extends the complete length of the jacket. The housing is therefore open at each of the longitudinal ends of the jacket. One of the longitudinal ends of the jacket includes an internal thread with which the screw is intended to cooperate to compress the jacket and to cause a portion of the polymerization components to exit the wall plug.

The two polymerization components are generally packaged in glass capsules that are intended to break and to release their contents when a screw is engaged in the wall plug. It is equally possible to encapsulate only one of the two components. The capsule containing one of the components is embedded in the other component that is retained inside the jacket by membranes that can be torn and that block the holes in the jacket. These membranes are produced by the same mold as the jacket and are formed in one piece with the latter. The jacket and its membranes are therefore made of the same material. It has already been proposed to produce these membranes by means of an external sock surrounding the jacket.

The polymerization components are known to degrade rapidly if they are not stored correctly, in particular in a sealed, notably airtight, volume.

As explained above, the internal housing of the jacket extends axially through this jacket and is open at its two axial ends. Although the polymerization components are prevented by the aforementioned sock from passing through the holes in the jacket, there exist at present no means to retain them and to protect them at the longitudinal ends of the jacket, and notably at the level of its internal thread, through which the components can flow. The polymerization components are therefore exposed to external conditions, such as moisture, at the open longitudinal ends of the jacket of the wall plug.

Moreover, the materials used at present to produce the sock of the wall plug are not satisfactory because they are too fragile and breakable and are subject to a risk of premature tearing, before the wall plug is used. Finally, the production of the sock and its mounting on the jacket are not a simple matter and are relatively costly. It is at present not possible to manufacture a thin sock because there would be the risk of it tearing when mounting it on the jacket. There is therefore a tendency to use a thick sock. Using a thick sock is nevertheless risky because there is a risk of it not tearing on compression of the wall plug and therefore preventing some of the polymerization components exiting the wall plug. Using a heat-shrink tubular sock could be envisaged but cannot always provide a good seal between it and the jacket.

The present invention proposes a simple, effective and economic solution to at least some of the problems of the prior art.

SUMMARY OF THE INVENTION

The invention therefore proposes a wall plug, in particular chemical, comprising:
i) a holed tubular jacket, this jacket defining an internal housing which emerges at each of the longitudinal ends of the jacket, and
ii) an outer sock which surrounds the jacket and covers the holes of the jacket,
characterized in that said sock covers said first end of the jacket so as to close said internal housing on the side of this first end.

In accordance with the invention, the outer sock does not merely cover the holes of the jacket as in the prior art but also covers the end of the jacket to close its internal housing at this end. The sock therefore forms a sheath all around the jacket and at the level of one end of the jacket.

The sock can therefore make it possible to transform the inner housing of the jacket into a sealed enclosure on the side of the tubular wall of the jacket and on the side of one of its ends. The other end of the jacket may include an external annular flange.

The end of the jacket that is closed by the sock preferably comprises on its internal periphery at least one helical rib forming an internal thread. If a screw is intended to be used with the wall plug in accordance with the invention, this helical rib is intended to cooperate with this screw so that screwing the screw into the wall plug leads to compression of the wall plug by movement toward each other of its longitudinal ends. This compression is advantageously intended to cause tearing of the sock at the level of the holes in the jacket. Moreover, on introducing the screw into the wall plug and screwing it in, the screw will come into contact with the portion of the sock covering its longitudinal end and will pierce this end. The sock therefore defines two portions that can be torn, the portion extending around the tubular portion of the jacket and that lying at the end of the jacket including the helical rib.

The sock is preferably formed in one piece. It is preferably produced by overmolding it onto the jacket. This technique enables precise control of the thickness of the sock. The sock may have a thickness less than or equal to 1 mm, for example between 0.1 and 0.8 mm. It is preferably made of an elastically deformable material.

The sock is preferably made of a material exhibiting high adhesion to the material of the jacket, so as to avoid the use of glue to join them. Overmolding the sock onto the jacket advantageously suffices to provide this connection by virtue of the adhesion of the material of the sock to that of the jacket.

The sock may be made of elastomer, such as thermosetting elastomer, thermoplastic elastomer (TPE), or rubber. The thermosetting elastomer is for example PDMS: polydimethylsiloxane. The thermoplastic elastomer may be (i) a styrene block copolymer such as SBS (styrene-butadiene-styrene), SIS (styrene-isoprene-styrene) or SEBS (styrene-ethylene-butylene-styrene), (ii) a mixture of rubber and polyolefin such as olefin-based polypropylene, (iii) a thermoplastic polyurethane, (iv) an ester-ether copolymer, etc.

In one particular embodiment of the invention, the jacket is made of thermoplastic (such as a polyamide) and the sock is made of thermosetting elastomer or thermoplastic elastomer. The jacket may be produced by injection molding.

The material of the sock preferably has one or more of the following characteristics:
- a Shore A hardness between 1 and 100, preferably between 30 and 100, more preferably between 50 and 80, even more preferably between 60 and 80, and for example of the order of 60-70;
- an elongation at fracture between 100 and 900%, preferably between 200 and 800%, more preferably between 200 and 700%, even more preferably between 200 and 500%, and for example of the order of 200-300%;
- a tensile strength between 1 and 10 MPa, preferably between 2 and 6 MPa, more preferably between 3 and 5 MPa, and for example of the order of 4-4.5 MPa;
- a resistance to tearing between 5 and 50 MPa, preferably between 10 and 50 MPa, more preferably between 20 and 50 MPa, even more preferably between 20 and 40 MPa, and for example of the order of 30-35 MPa;
- an extrusion rate or speed between 10 and 130 g/min, preferably between 30 and 120 g/min, and for example between 50 and 100 g/min; this extrusion rate is notably a function of the viscosity of the material, which is preferably neither too low (material too fluid), which would create risks of infiltration in the mold, nor too high, which could impede its injection.

The invention is particularly but not exclusively suitable for producing a chemical wall plug. The wall plug can therefore include inside said housing a resin component and a hardener component intended to be mixed and to polymerize, for example because of the compression of the jacket, to fix the wall plug. The hardener component is preferably housed in a capsule, for example of glass, which is embedded in the resin component which is directly in contact with the jacket. The sock of the wall plug therefore retains the resin component through the holes of the jacket and through the aforementioned end of the jacket.

In accordance with a preferred embodiment of the invention, the wall plug comprises a plug which is fitted in a second longitudinal end of the jacket, opposite said first end. This plug is preferably configured to close said end in a sealed manner. The housing of the jacket is thus transformed into a totally sealed enclosure.

The plug is preferably tubular and defines an internal space which emerges at each of the longitudinal ends of the plug. The plug may comprise on its internal periphery at least one helical rib forming an internal thread. This internal rib is advantageously intended to cooperate with a screw so as to center it upon its introduction into the wall plug. This rib is advantageously similar to that of the jacket. Thus the ribs of the jacket and the plug may be adapted to cooperate with the same screw. The ribs or threads have the same pitch, for example, which is between 1 and 5 mm, preferably between 2 and 4 mm, and for example approximately 3 mm. Rt least one of these ribs (and preferably each of them) is configured to allow the screw to pass only upon screwing it in. This makes it possible to limit the risk of accidental introduction of the screw into the wall plug.

At least one of the longitudinal ends of the plug is advantageously covered by a transverse membrane so as to close said internal space at this end. This membrane therefore makes it possible to close the internal housing of the jacket at said second end, preferably in a sealed manner.

The membrane is preferably molded onto the plug. The membrane may have a thickness less than or equal to 1 mm, and for example between 0.1 and 0.8 mm. It is preferably made of elastically deformable material. It may be made of the same material as the aforementioned sock.

The membrane may be made of elastomer, such as thermosetting elastomer, thermoplastic elastomer (TPE), or rubber. The thermosetting elastomer is for example PDMS: polydimethylsiloxane. The thermoplastic elastomer may be (i) a styrene block copolymer such as SBS (styrene-butadiene-styrene), SIS (styrene-isoprene-styrene) or SEBS (styrene-ethylene-butylene-styrene), (ii) a mixture of rubber and polyolefin such as olefin-based polypropylene, (iii) a thermoplastic polyurethane, (iv) an ester-ether copolymer, etc.

In one particular embodiment of the invention, the plug is made of thermoplastic (such as a polyamide) and the membrane is made of thermosetting elastomer or thermoplastic elastomer. The plug may be produced by injection molding.

The present invention further concerns a fixing kit characterized in that it comprises a wall plug as described above and a screw. This screw is advantageously configured to cooperate with the internal rib of the jacket and where appropriate with that of the plug. This screw may include two threaded portions with different pitches. The screw preferably has a pointed longitudinal end to facilitate piercing the sock and where applicable the membrane.

The screw may have a diameter between 6 and 20 mm and preferably between 10 and 16 mm.

BRIEF DESCRIPTION OF THE FIGURES

The invention will be better understood and other details, features and advantages of the present invention will become more clearly apparent on reading the following description, given by way of nonlimiting example and with reference to the appended drawings, in which.

DETAILED DESCRIPTION

Figure 1:
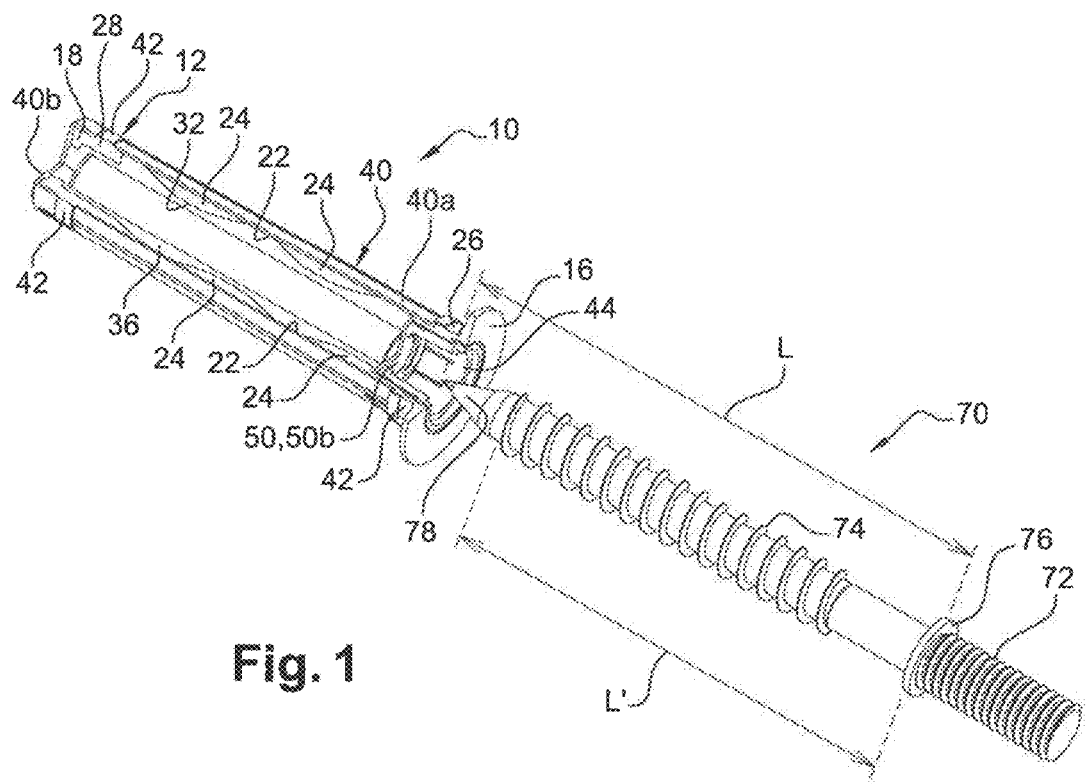
FIG. 1 is a diagrammatic part-sectional perspective view of a fixing kit in accordance with the invention including a chemical wall plug and a screw.
Figure 2:
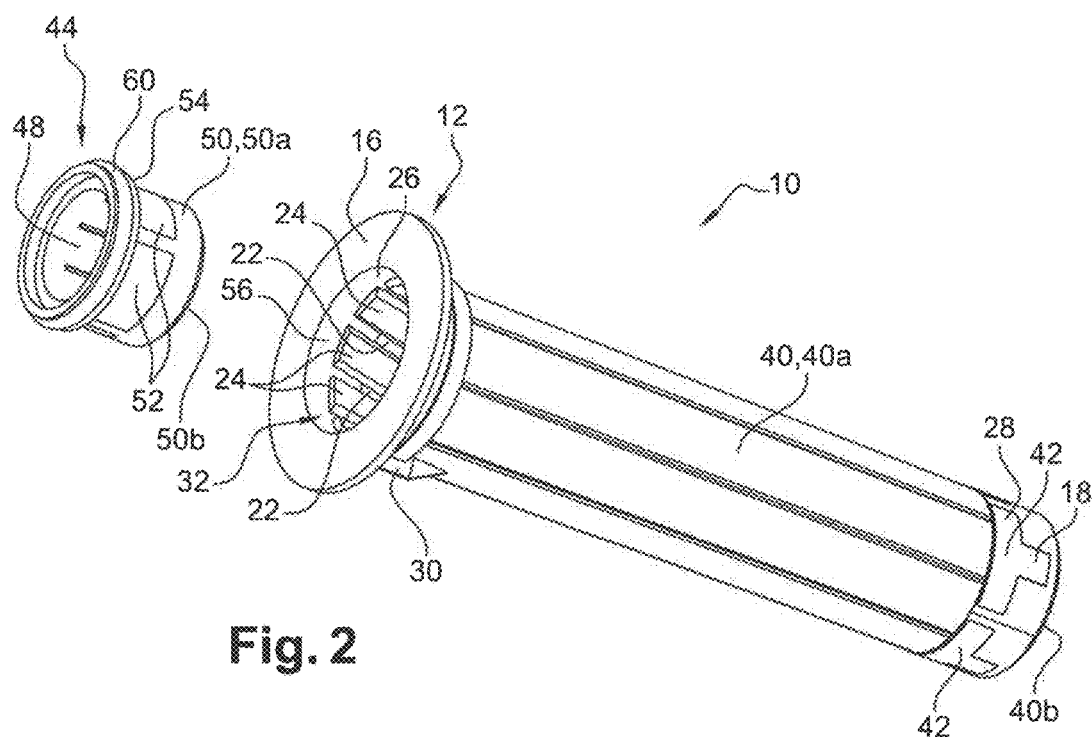
FIG. 2 is a diagrammatic exploded perspective view of the wall plug from FIG. 1.
Figure 3:
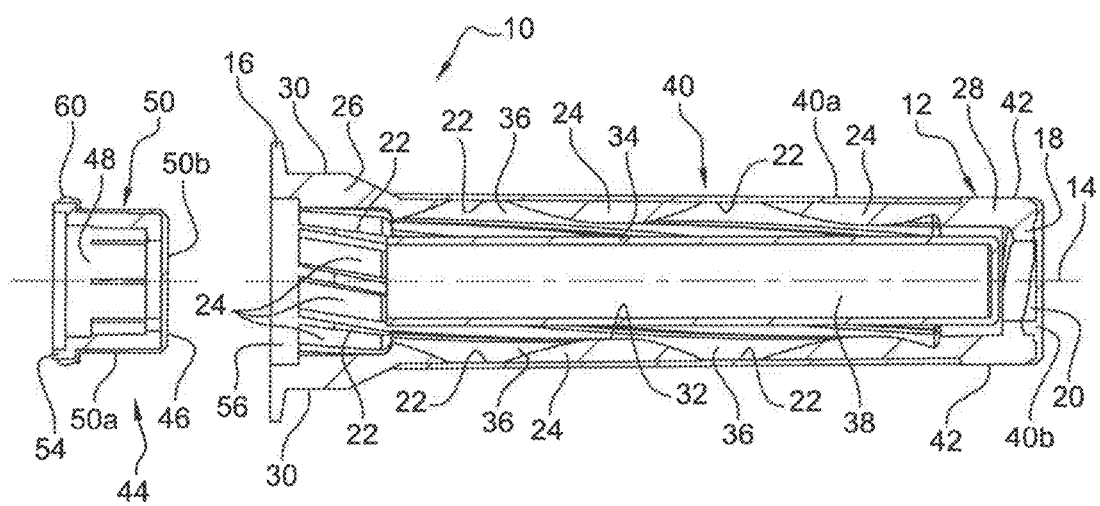
FIG. 3 is a diagrammatic exploded view in axial section of the wall plug from FIG. 1.

FIGS. 1 to 3 represent one embodiment of the wall plug 10 in accordance with the invention, which here is a chemical wall plug, this wall plug 10 notably being used for the chemical and mechanical fixing of a part to a support material as described in detail with reference to FIG. 4.

The wall plug 10 includes a tubular jacket 12, here of plastic material, with axis 14. The jacket 12 is made of thermoplastic, for example, such as polyamide (for example PA6).

The jacket 12 extends between an end including an annular bearing flange 16 and another end 18 opposite that with the flange 16 and forming a traction nut, as will be explained hereinafter, thanks to an internal thread 20 that may comprise a single projecting rib inside this end 18.

The jacket 12 is holed, i.e. its tubular wall includes holes, which here are formed by helical slots 22 extending over a major portion of the axial length of the jacket 12.

Each slot 22 extends between two adjacent longitudinal strips 24 of material each of which has a helical general shape. The slots 22 have a width that depends on the spacing between these strips 24 of material, which is typically between 0.2 and 1.5 mm, preferably between 0.5 and 1 mm, and for example of the order 0.8-0.9 mm.

The strips 24 of material extend between two non-holed annular end portions 26, 28 of the jacket 12. The strips 24 of material are joined to the flange 16 by a first annular end portion 26. This first end portion 26 has on its outside periphery anti-rotation ribs 30.

The second annular end portion 28 has on its inside periphery the aforementioned internal thread 20. The strips 24 of material are inscribed in a cylinder the outside diameter of which is substantially equal to that of the end portions 26, 28.

The jacket 12 defines an internal housing 32 that is open at each of its longitudinal ends. Taking the jacket 12 in isolation, its housing 32 in fact communicates with the outside via its internal thread 20 and its end including the flange 16.

The wall plug 10 is intended to contain polymerization components and in particular a resin component 36 and a hardener component 38. In the example shown, the hardener component 38 (for example a peroxide in powder form) is situated in a closed capsule 34, for example of glass, which has an elongate shape and extends inside the housing 32 coaxially with the wall plug 10 and over substantially all its length. The capsule 32 of hardener 38 is embedded in the resin component 36 which therefore extends around the capsule, between the capsule and the tubular wall of the jacket 12, as well as between the end 18 of the jacket 12 and the adjacent end of the capsule 34.

In accordance with the invention, the housing 32 of the jacket 12 is sealed by a first sock 40 that surrounds the jacket 12 to cover its holes or slots 22 and to cover the end 18. The sock 40 therefore has two parts, a tubular first part 40a that extends around the tubular wall of the jacket 12 over substantially all its axial dimension, i.e. extends beyond the axial ends of the strips 24 of material, as far as the annular end portions 26, 28, which it overlies, and a transverse second part that forms a first membrane 40b blocking the end 18 of the jacket 12. This transverse part or membrane 40b of the sock 40 therefore prevents accidental exit of the resin component 36 via the end 18 of the jacket.

This sock 40 is preferably overmolded onto the jacket 12. To this end, the jacket 12 may be held by a spindle (not shown) engaged axially in the jacket 12 that is housed in a mold (not shown) for the overmolding operation. To ensure correct positioning of the jacket 12 in the mold, the latter may include radial fingers (radial relative to the axis 14 of the wall plug 10) intended to bear on the jacket 12. In the example shown, four fingers bear on the annular end portion 28 of the jacket 12. Because of this bearing engagement, which is maintained during the overmolding operation, the jacket 12 will clearly not be covered with the material of the sock 40 at the level of the bearing areas. In the example shown, these bearing areas 42 are generally T-shaped.

The wall plug 10 in accordance with the invention further includes a plug 44 that is configured to be mounted in the end of the jacket 12 including the flange 16 and to block the internal housing 32 of the jacket at this end.

The plug 44 has a tubular shape with axis 14. Here it is made of plastic material. The plug 44 is for example made of thermoplastic, such as polyamide (for example PA6). It includes at one of its ends an internal thread 46 that may comprise a single rib projecting inside this end.

The plug 44 defines an internal space 48 that is open at each of its longitudinal ends. Taking the plug 44 in isolation, its space 48 in fact communicates with the outside via its internal thread 46 and its opposite end.

In accordance with the invention, the housing 32 of the jacket 12 is sealed by a second sock 50 that surrounds the plug 44 to cover its tubular wall and to cover the end of the plug including the internal thread 46. The sock 50 therefore has two parts, a tubular first part 50a that extends around the tubular wall of the plug 44 over substantially all its axial dimension and a transverse second part that forms a second membrane 50b for blocking the end of the plug 44. This transverse part or membrane 50b of the second sock 50 therefore prevents accidental exit of resin component 36 via the end of the jacket 12 including the flange 16.

This sock 50 is preferably overmolded onto the plug 44. To this end, the plug 44 may be held by a spindle engaged axially in the plug 44 that is housed in a mold for the overmolding operation. To ensure correct positioning of the plug 44 in the mold, the mold may include radial fingers (radial relative to the axis 14 of the plug) intended to bear on the plug, as explained above. In the example shown, these bearing areas are referenced 52.

The plug 44 may be inserted or force-fitted into the end of the jacket 12. It may have a diameter substantially equal to or slightly greater than the inside diameter of the end portion 26 or the strips 24 of material of the jacket 12. The tubular portion 50a of the sock 50 may be designed to deform slightly through compression on mounting the plug 44 and/or to take up any play caused by manufacturing tolerances.

The plug 44 may include at its end opposite the membrane 50b an annular external rim 54 the external periphery of which is intended to cooperate with a cylindrical internal entry surface 56 of the jacket 12, and in particular the end portion 26 thereof, and is able to come to bear axially on the ends of the strips 24 of material to define a correct position upon mounting the plug 44 in the jacket 12.

The rim 54 of the plug 44 is covered by the sock 50 which forms around this rim an additional thickness or an annular bead 60. This bead 60 is intended to be compressed between the rim 54 and the surface 56 in the mounted position of the plug 44 in the jacket and to provide a seal between the plug 44 and the jacket 12.

The wall plug 10 is intended to be compressed by a traction screw 70 which here is also a fixing screw, intended to engage the threads 46, 20 of the wall plug (the thread 46 of the plug 44 and the thread 20 of the jacket 12).

The screw 70 includes two axial threaded portions 72, 74 separated from one another by an annular external flange 76. The first threaded portion 72 is intended to lie outside the wall plug 10, after fitting, and to receive a part to be fixed to the screw 70 by a nut to be screwed onto this threaded portion 72.

The flange 76 of the screw 70 is intended to come to bear against the flange 16 of the wall plug 10 which is itself intended to bear against a support material in a hole in which the wall plug 10 is engaged.

The second threaded portion 74 of the screw 70 is configured to cooperate with the threads 46, 20 of the wall plug 10 and is therefore sized accordingly. The threaded portion 74 therefore includes at least one external helical rib the pitch of which is substantially equal to that of the threads 46, 20, which is preferably between 1 and 5 mm, and is approximately 3 mm in the example shown. The screw 70 forms a traction element because it is configured to cooperate with the thread 20 of the wall plug to pull the end 18 toward the flange 16, i.e. to compress the wall plug 10 axially.

The end 78 of the screw 70 opposite its threaded part 72 is in the form of a spike to facilitate piercing of the membranes 50b, 40b upon introduction of the screw into the wall plug 10. It is clear that the axial distance L between the flange 76 and the tip of the screw 70 must be greater than the length of the wall plug 10 so that the screw has already pierced the membrane 40b of the wall plug when its flange 76 bears on the flange 16 of the wall plug 10. It is also clear that the axial distance L' between the flange 76 and the end of the threaded portion 7 situated on the side opposite the flange 76 must be greater than the distance between the flange 16 of the wall plug and its thread 20 so that the screw can cooperate with this thread before its flange 76 comes to bear on that of the wall plug 10.

The combination comprising the wall plug 10 and the screw 70 forms a fixing kit in accordance with the invention.

Figure 4:
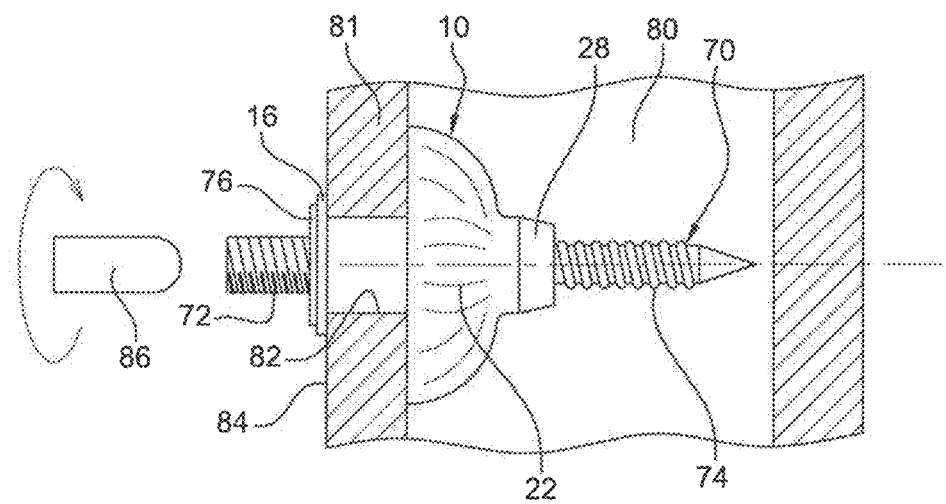
FIG. 4 is a diagrammatic sectional view of a support material into a hole in which is fixed a chemical wall plug in accordance with the invention.

Refer from now on to FIG. 4, which shows diagrammatically the kit after its use to fix a part to a support material 80.

Here the support material 80 is a hollow material an exterior wall 81 of which is pierced by a hole 82 having a diameter slightly greater than the outside diameter of the jacket 12 of the wall plug 10. The wall plug 10 is introduced into the hole 82 until its flange 16 is pressed against the exterior surface 84 of the wall 81. Then, using a tool and an appropriate screw-driving bit 86, the screw 70 is driven in rotation.

The screw 70 is firstly introduced into the plug 44 of the wall plug 10 until its tip pierces the membrane 50b. The end of the threaded portion 74 opposite the flange 76 is then able to cooperate with the thread 20 of the plug 44. As explained above, the screw cannot be introduced into the wall plug by simple movement in axial translation of the screw 70 in the wall plug 10 because the thread 20 of the plug forms retaining means cooperating in axial abutment engagement with the aforementioned end of the threaded portion 74 of the screw to prevent this movement in translation. The screw 70 can be introduced into the wall plug only by rotating the screw to screw it into the plug. During screwing, the screw 70 advances in the wall plug and breaks the capsule 34 of hardener component 38, which mixes with the resin component 36. The threaded portion 74 of the screw may therefore be viewed as similar to a lead screw for mixing the polymerization components. This effect is accentuated by the fact that a plurality of turns of the screw are necessary for it to pass axially through the wall plug. Rotation of the screw 70 is maintained until its tip pierces the membrane 40b and the end of the threaded portion 74 opposite the flange 76 cooperates with the thread 20 of the wall plug. Continued screwing leads to movement of the end portion 28 of the wall plug, which moves along the screw and approaches the other end portion 26 that is held immobile by virtue of the flange 16 pressing on the exterior surface 84 of the support material 80. This causes compression and radial expansion of the wall plug 10 to form a knot behind the wall 81 so that the wall plug 10 is already fixed mechanically to the wall 81. The compression of the wall plug causes tearing of the sock 40 at the level of the slots 22 of the jacket 12. The mixture of polymerization components is then partly expelled through these slots 22 to form behind the wall 81 a mass that polymerizes to compete by chemical means the fixing of the wall plug to the wall 81.

The invention claimed is:

1. Wall plug, in particular chemical, comprising:
   i) a holed tubular jacket, this jacket defining an internal housing which emerges at each of the longitudinal ends of the jacket, and
   ii) an outer sock which surrounds the jacket and covers the holes of the jacket,
   wherein said sock covers a first longitudinal end of the jacket so as to close said internal housing on the side of this first end.

2. Wall plug according to claim 1, wherein said first end of the jacket comprises, on its internal periphery, at least one helical rib forming an internal threading.

3. Wall plug according to claim 1, wherein the sock is produced by overmolding on the jacket.

4. Wall plug according to claim 1, wherein the sock is made from an elastically deformable material.

5. Wall plug according to claim 1, wherein the sock is made from elastomer, such as of thermosetting elastomer, thermoplastic elastomer or rubber.

6. Wall plug according to claim 1, wherein the sock has a thickness less than or equal to 1 mm.

7. Wall plug according to claim 1, wherein it also comprises, inside said housing, a resin component and a hardener component intended to be mixed and to polymerize.

8. Wall plug according to claim 7, wherein the hardener component is housed in a capsule which is embedded in the resin component which is directly in contact with the jacket.

9. Wall plug according to claim 1, wherein it also comprises a plug which is fitted in a second longitudinal end of the jacket, opposite said first end.

10. Wall plug according to claim 9, wherein the plug is tubular and defines an internal space which emerges at each of the longitudinal ends of the plug.

11. Wall plug according to claim 10, wherein the plug comprises, on its internal periphery, at least one helical rib forming an internal threading.

12. Wall plug according to claim 10, wherein at least one of the longitudinal ends of the plug is covered by a transversal membrane so as to close said internal space, on the side of this end.

13. Fixing kit, wherein it comprises a wall plug according to claim 1 and a screw.

\* \* \* \* \*